US006782268B1

(12) United States Patent
Thompson et al.

(10) Patent No.: US 6,782,268 B1
(45) Date of Patent: Aug. 24, 2004

(54) METHOD AND APPARATUS FOR TRACKING CALL HISTORY FOR MOBILE AND WIRELINE USERS ACCESSING THE NETWORK ON DIFFERENT PORTS FOR SUBSEQUENT CALLS

(75) Inventors: Jane Ann Thompson, Batavia, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/103,021

(22) Filed: Jun. 23, 1998

(51) Int. Cl.[7] ................................................. H04Q 7/20
(52) U.S. Cl. ...................... 455/461; 455/415; 455/403
(58) Field of Search ............................... 455/415, 403, 455/417, 422, 433, 435, 436, 461, 428, 564, 186.1; 379/135, 134, 112.07, 142.01, 188, 189, 201.01, 196, 199, 111, 265.01, 266.01, 91.01, 115.01, 201.07, 209.01

(56) References Cited

U.S. PATENT DOCUMENTS

| 4,464,543 A | * | 8/1984 | Kline et al. ................ 179/8 R |
| 4,602,128 A | | 7/1986 | Freundlich |
| 5,263,080 A | * | 11/1993 | Jones et al. .................... 379/88 |
| 5,572,727 A | * | 11/1996 | Larsson et al. ............. 707/200 |
| 5,581,611 A | | 12/1996 | Yunoki |
| 5,706,330 A | * | 1/1998 | Bufferd et al. ................ 379/58 |
| 5,774,526 A | * | 6/1998 | Propp et al. ............. 379/90.01 |
| 5,793,856 A | * | 8/1998 | Nakamura ................... 379/522 |
| 5,835,497 A | * | 11/1998 | Litzenberger et al. ...... 370/522 |
| 5,845,201 A | * | 12/1998 | Funke et al. ................ 455/403 |
| 5,845,211 A | * | 12/1998 | Roach, Jr. ................... 455/436 |
| 5,867,565 A | * | 2/1999 | Morikawa ................... 379/113 |
| 5,896,445 A | * | 4/1999 | Kay et al. .................... 379/135 |
| 5,896,448 A | * | 4/1999 | Holt ............................ 379/211 |
| 5,913,160 A | * | 6/1999 | Leung ......................... 455/403 |
| 5,943,409 A | * | 8/1999 | Malik .......................... 379/209 |
| 5,999,604 A | * | 12/1999 | Walter ......................... 379/133 |
| 6,009,321 A | * | 12/1999 | Wang et al. ................. 455/410 |
| 6,043,903 A | * | 3/2000 | Nakai et al. ................. 358/437 |
| 6,064,725 A | * | 5/2000 | Nakanishi .................... 379/140 |

FOREIGN PATENT DOCUMENTS

DE 40 31 857 A 4/1992

OTHER PUBLICATIONS

Garg V. K. et al.: "Subscriber Data Management in Personal Communications Services Networks" IEEE Personal Communications, US, IEEE Communications Society, vol. 4, No. 3 Jun. 1, 1997, XP 000655314.

Mouly, Michel; Pautet, Marie–Bernadette: "The GSM System for Mobile Communications—7.1 Location Management" Published by the Authors, XP002129579.

* cited by examiner

*Primary Examiner*—Edward F. Urban
*Assistant Examiner*—C. Chow

(57) ABSTRACT

This invention provides a method and apparatus for associating call data with particular users instead of line ports. This call data includes the last incoming and outgoing calls associated with a particular number. This allows the services such as automatic callback, automatic recall, and customer originated trace to be implemented with dynamic line assignment allowing users to maintain the same level of subscribed services at different locations. For mobile users, automatic callback, automatic recall, and customer originated trace can be implemented at the home mobile switching center as well as roaming mobile switching centers. If the mobile user is roaming, updating the call history of the mobile station at the new mobile switching center allows the mobile user to experience seamless services across a large territory.

20 Claims, 13 Drawing Sheets

METHOD AND APPARATUS FOR TRACKING CALL HISTORY FOR MOBILE AND WIRELINE USERS ACCESSING THE NETWORK ON DIFFERENT PORTS FOR SUBSEQUENT CALLS

FIELD OF THE INVENTION

This invention relates to the tracking of call history for wireline users and updating this information at new switches as dynamic line assignment is employed. This invention also applies to mobile users as call history is transferred between mobile switching centers as a mobile user roams.

BACKGROUND

Currently, there are several services offered by telecommunication providers where previous call history from the line port used by the subscriber is used as input data. Examples of these services include automatic callback, automatic recall, and customer originated trace. The automatic callback service allows a user to place a call to the last party that called the user. The automatic recall service allows a user to place a call to the same number the user last called. And, the customer originated trace allows a user to request an automatic trace of the last incoming call. For these types of services, saving the call history of a user is accomplished by saving the call history data as it relates to a particular line port.

There is a need to store call history related to users versus line ports. This is important because certain categories of users may not use the same line ports for subsequent calls. These users include mobile subscribers served via a pool of lines at the central office, wireline subscribers served via pool of lines at the central office where there are many subscribers in relation to a fewer number of ports (possibly for economic reasons in the case of competitive access providers), personal mobility service via wire line phones (smart cards that identify the person on "public" phones), and mobile subscribers on a mobile switching center where line ports are not used. Therefore, a need exists to track and store call history as it relates to a subscriber number rather than a line port.

SUMMARY

This invention provides a method and apparatus for associating call data with particular users instead of line ports. This call data includes the last incoming and outgoing calls associated with a particular number. This allows the services such as automatic callback and automatic recall and customer originated trace to be implemented without regard to the line port allowing users to maintain the same level of subscribed services at different locations.

For mobile users, automatic callback and automatic recall and customer originated trace can be implemented at the home mobile switching center as well as roaming mobile switching centers. If the mobile user is roaming at least two schemes can be deployed for updating the mobile switching center with call history information. First, when the mobile station registers with a mobile switching center, the previous mobile switching center transmits the call history to the new mobile switching center. Second, when the mobile station registers with a mobile switching center, the home location register or the wireless intelligent network obtains the call history information from the previous mobile switching center and transmits this information to the new mobile switching center.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
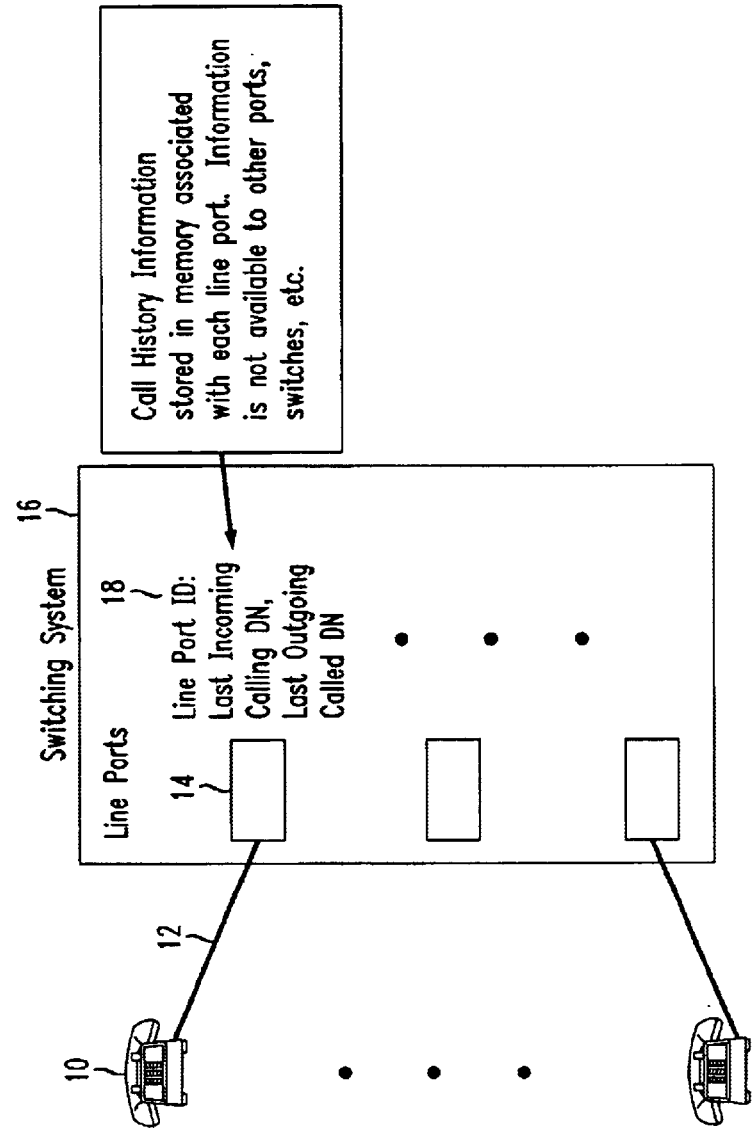
FIG. 1 illustrates a prior art block diagram of a switching system with the call history associated with the line ports.

FIG. 1 illustrates a prior art block diagram of a switching system with the call history associated with the line ports. In prior art systems, subscriber telephones 10 are connected via twisted pair lines 12 to line ports 14 located in the switching system 16. Each line port 14 is connected and associated with a specific subscriber's telephone line 12. Call history information is stored in the switching system's memory and associates call history information such as last called number and last calling number with each line port ID 18.

Figure 2:
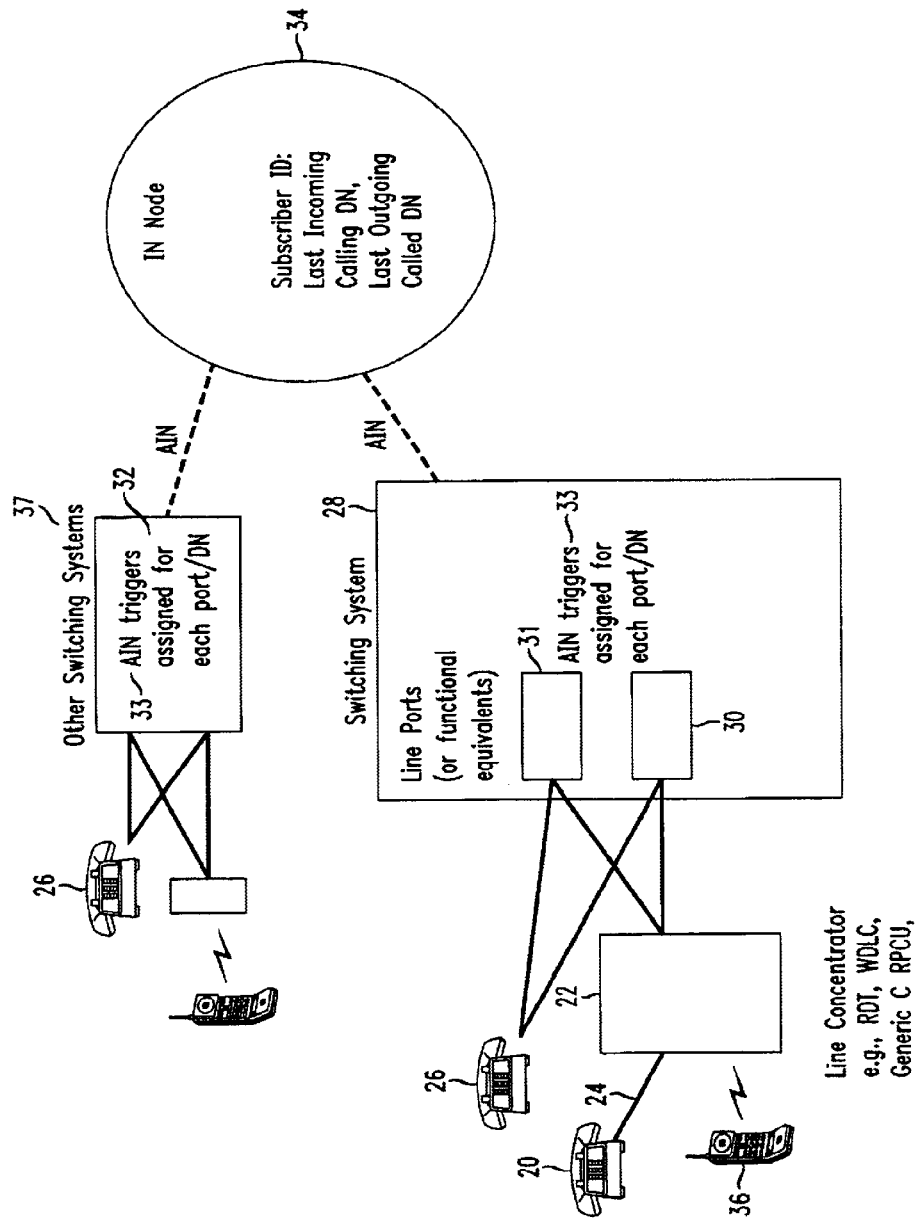
FIG. 2 illustrates a block diagram of tracking the call history for an intelligent network node.

FIG. 2 illustrates a block diagram of a switching system with an intelligent network based call history. A subscriber's telephone 20 is connected to a line concentrator 22 containing a plurality of line cards or port via a twisted pair 24. A line concentrator 22 is an interface that allows low-usage subscriber lines to connect to the high-usage channels. Other telephones 26 and the line concentrators 22 are connected to the switching systems 28 at line ports 31 and 32. The switching system 28 can store into memory information regarding the tracking of each telephone independent of the line card or port. Each switching system 28 can support a plurality of line ports 30 and 31. Advanced intelligent network triggers 33 are assigned to each line port 30. The switching system 28, as well as other switching systems 37 are connected to an intelligent network node 34. The intelligent network node 34 assists in the transfer and storage of call history information such as the subscriber ID, last incoming calling dialed number, and the last outgoing called dialed number.

For example, as a user 36 disconnects from switching system 28, the call history information that is associated with a particular subscriber is tracked by the intelligent network node 34 via originating and terminating triggers. As other users 20 attempt to access the switching system 28, the line port 30 previously used by user 36 is now available to user 20 at the switching system 28. Since the intelligent network node 34 is tracking the call history of the users and not the line ports, hardware can be optimized across the switching system 28.

Figure 3:
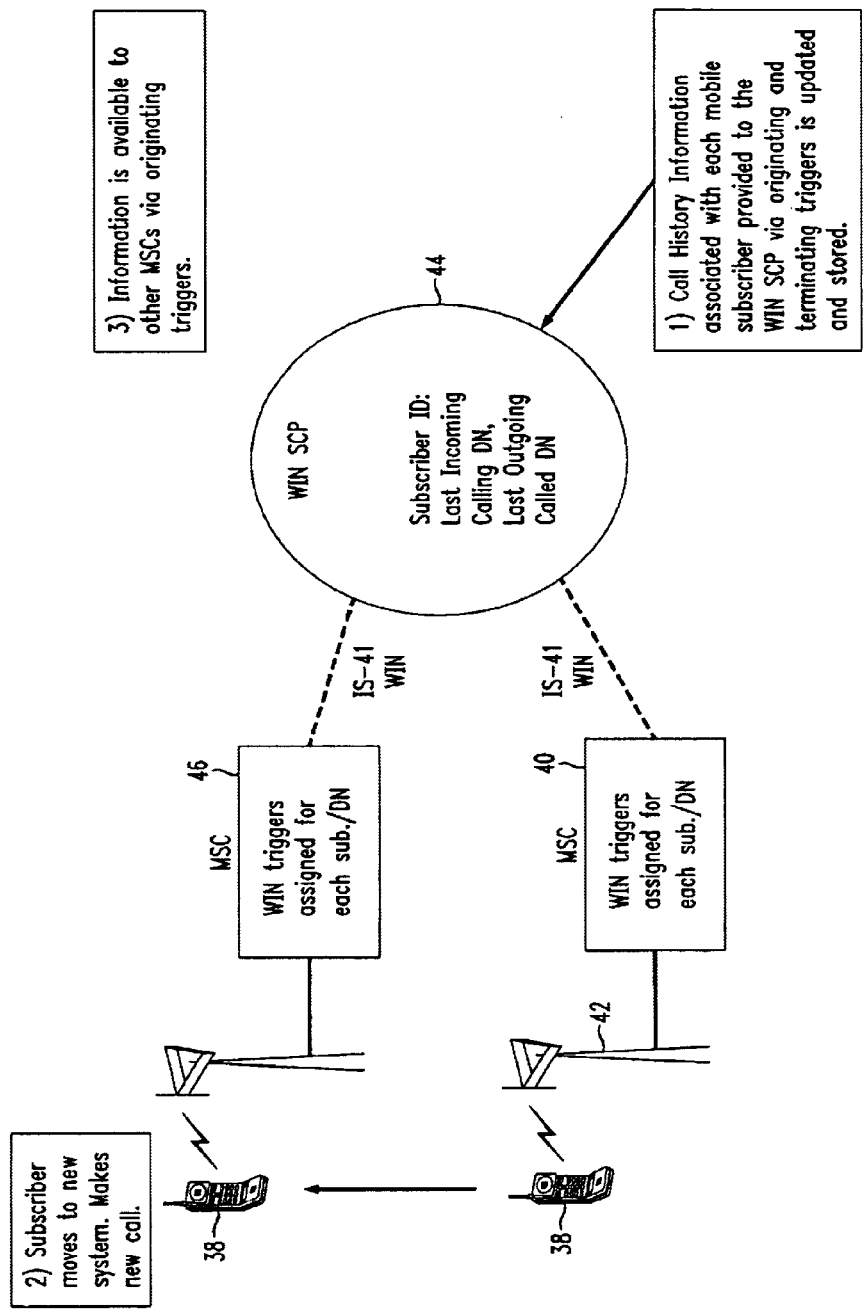
FIG. 3 illustrates a block diagram of tracking the call history for wireless subscribers via a wireless intelligent network node service control point.

FIG. 3 illustrates a block diagram of tracking the call history for wireless subscribers via a wireless intelligent network. When mobile user 38 connects to the mobile switching center (MSC) 40 through the base station 42, wireless intelligent network triggers are sent to the wireless intelligent network node service control point (WIN/HLR) 44 by the MSC 40. As the mobile user 38 travels to a point where the mobile switching center 40 terminates service and transfers the service of the user 38 to a different MSC 46, the WIN/SCP 44 updates the call history and any additional information from the home location register (HLR) to the new MSC 46. This information is provided to and from the WIN/SCP 44 by originating and terminating triggers.

Figure 4:
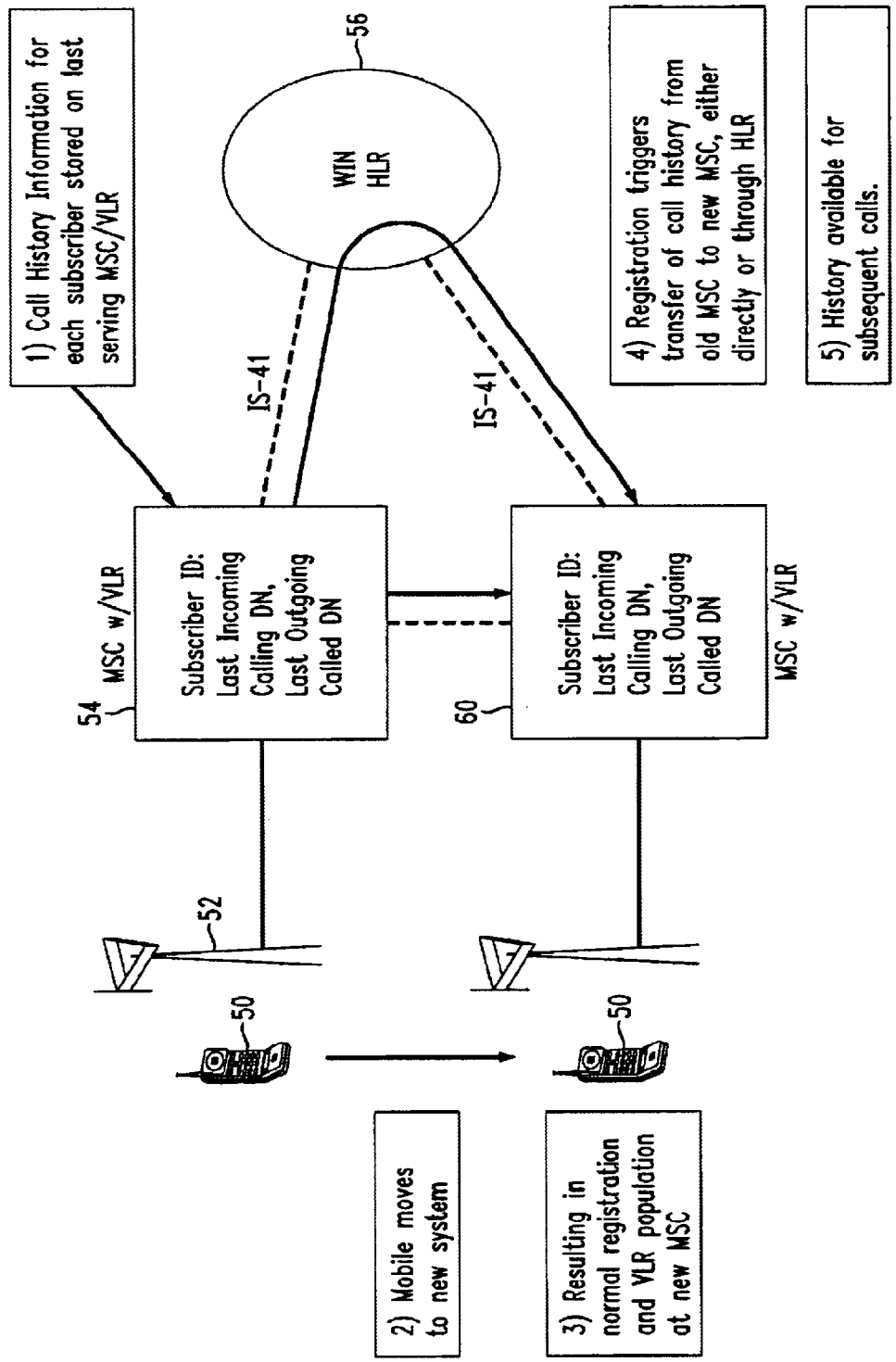
FIG. 4 illustrates a block diagram for transferring call history information to the various mobile switching centers.

FIG. 4 illustrates a block diagram for transferring call history information to the various mobile switching centers. When a mobile user turns on the cellular telephone (mobile station) 50, a registration message is sent from the mobile station 50 to the base station 52. A series of base stations are connected to a MSC 54.

When the mobile user places or receives a telephone call, the call history information is updated in the MSC 54. When the mobile station 50 moves to the outer range of the MSC 54, the mobile station 50 registers on the MSC 60 that is closest and capable of supporting the mobile station 50. The MSC 60 sends a registration message to the WIN/SCP 56.

There are at least two schemes for transferring call history information to the new MSC 60. First, the WIN/HLR 56 informs the second MSC 60 of the location of the most recent VLR for the mobile station 50 specifying the MSC 54. The MSC 60 sends a request to the MSC 54 for the most recent VLR and call history associated with mobile station 50. This information is sent by the MSC 54 to the MSC 60 and MSC 54 deletes the VLR corresponding to mobile station 50.

Second, the WIN/HLR 56 builds a new VLR for the mobile station 50 at the second MSC 60. A cancellation message is sent from the WIN/HLR 56 to the first MSC 54. As part of cancellation, the MSC 54 transmits the call history associated with the mobile station 50 to the WIN/HLR 56. The second MSC 60 receives the VLR including the call history from the WIN/HLR 56.

Figure 5:
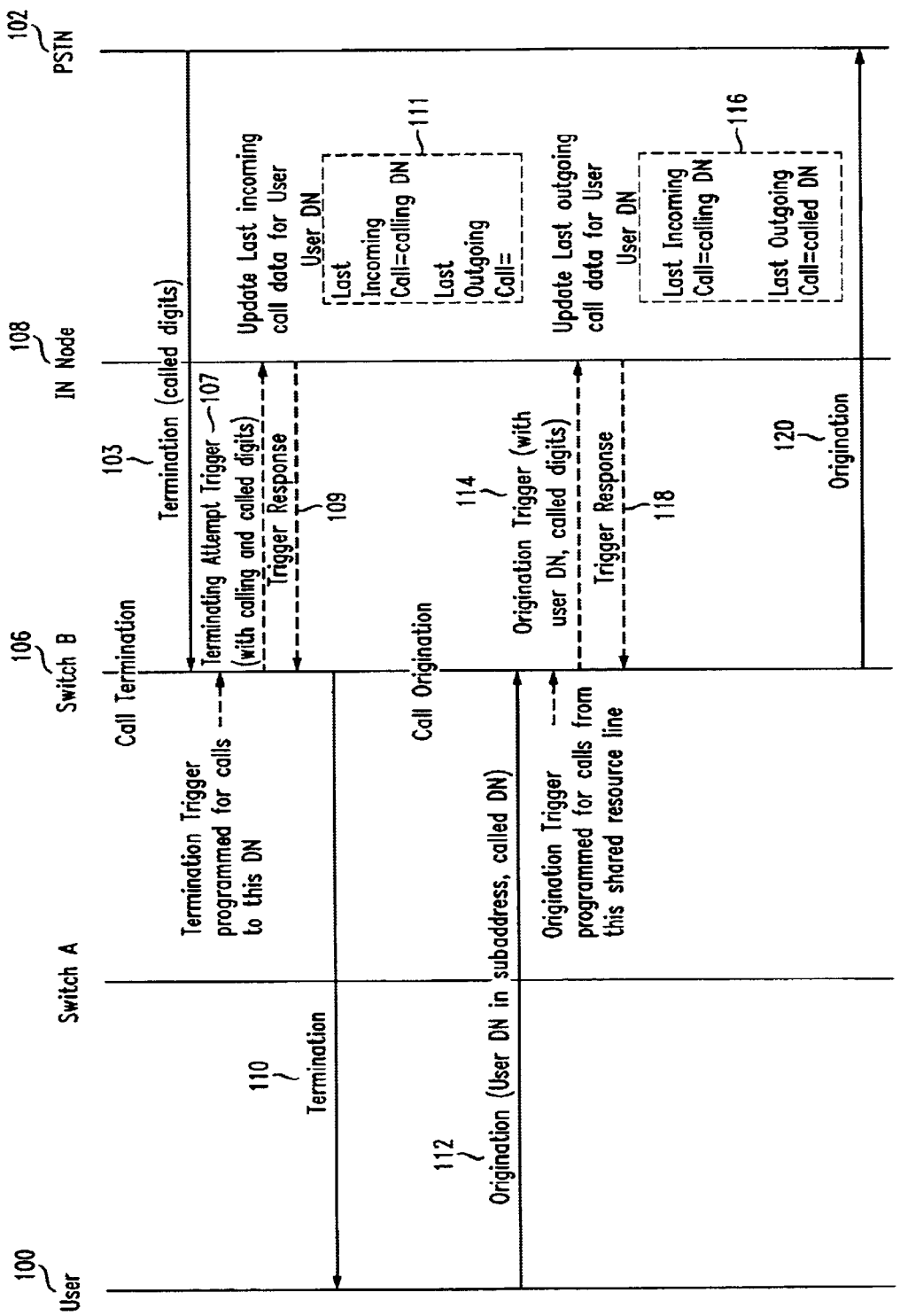
FIG. 5 illustrates a message flow diagram for call origination and termination and the associated updating of call history information for an intelligent network node.

FIG. 5 illustrates a message flow diagram for call origination and termination and the associated updating of call history information. When a user 100 receives an incoming call from another party on the PSTN 102 and the call is terminated 103 to switch B 106. Switch B 106 sends a termination message 107 with the calling digits to the intelligent network node 108. The intelligent network node 108 updates the call history information 111 with the telephone number of the other party who called the user 100. A trigger response 109 is sent by the intelligent network node 108 to switch B 106. Switch B 106 terminates the call 110.

When the user 100 originates a call 112, an origination trigger with the called number 114 is sent by switch B 106 to the intelligent network node 108. The intelligent network node 108 updates the call history information with the called number 116. The intelligent network 116 transmits a trigger response to switch B 106 and the origination call 120 is placed on the PSTN 102.

Figure 6:
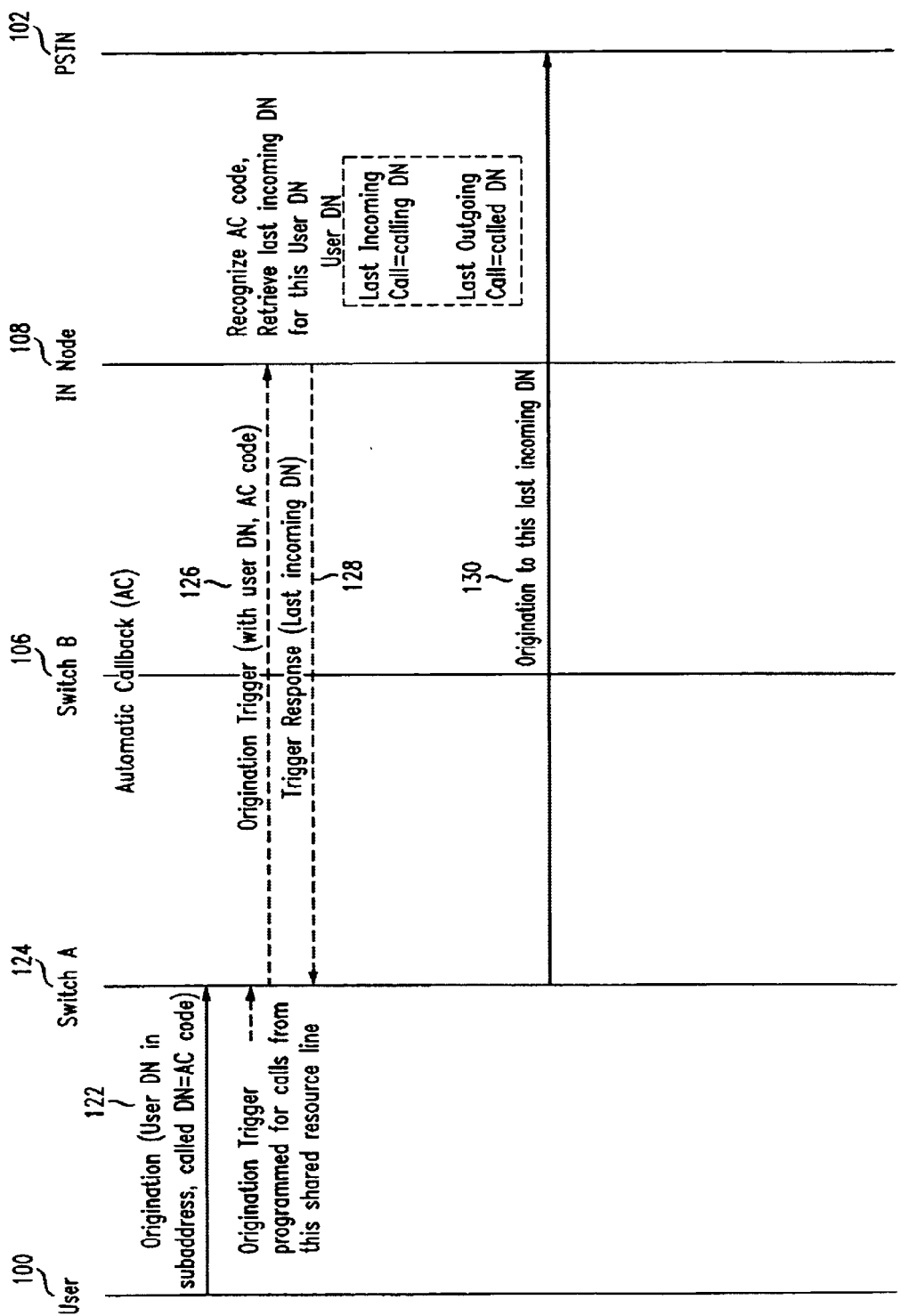
FIG. 6 illustrates a message flow diagram for automatic callback service when a user employing dynamic line assignment moves to a new switch.

FIG. 6 illustrates a message flow diagram for automatic callback service when a user employing dynamic line assignment moves to a new switch. With dynamic line assignment, a subscriber to a particular set of services has access to those services at different locations. For example, a subscriber who has subscribed to automatic call back service at home, can have that service while on a business trip. When the user 100 from FIG. 5, invokes the automatic call back service at another location, an origination signal 122 is sent to switch A 124. Switch A 124 transmits an origination trigger 126 to the intelligent network node 108. The intelligent network node 108 recognizes the automatic call back service code, and retrieves the last incoming dialed number for user 100. The intelligent network node 108 transmits a trigger response with the last incoming dialed number 128 to switch A 124. Switch A 124 places the origination call 130 to the last dialed number.

Figure 7:
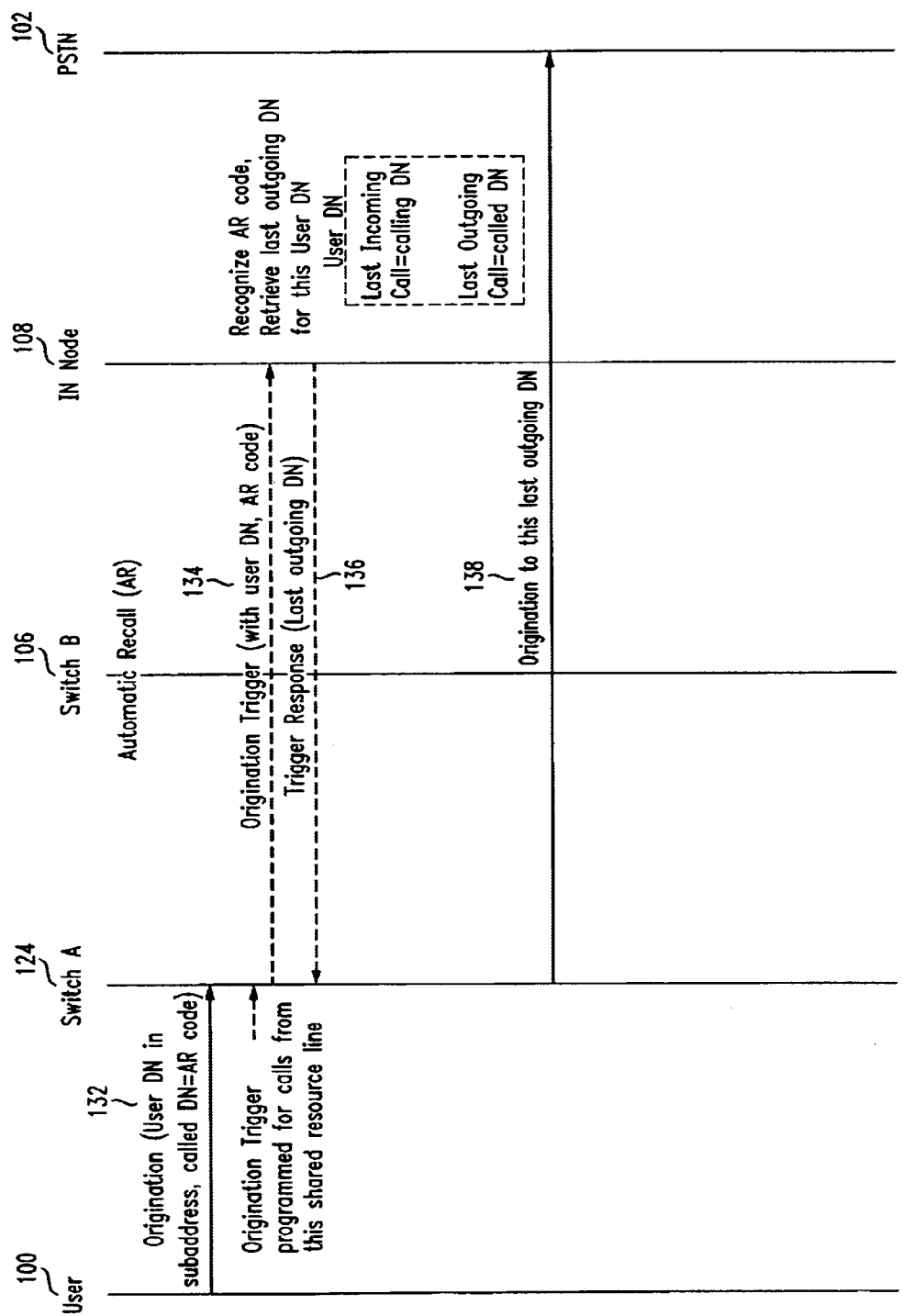
FIG. 7 illustrates a message flow diagram for automatic recall service when a user employing dynamic line assignment moves to a new switch.

FIG. 7 illustrates a message flow diagram for automatic recall service when a user moves to a new switch. When the user 100 from FIG. 7, invokes the automatic recall service at another location, an origination signal 132 is sent to switch A 124. Switch A 124 transmits an origination trigger 134 to the intelligent network node 108. The intelligent network node 108 recognizes the automatic recall service code, and retrieves the last outgoing dialed number for user 100. The intelligent network node 108 transmits a trigger response with the last outgoing dialed number 136 to switch A 124. Switch A 124 places the origination call 138 to the last dialed number.

Figure 8:
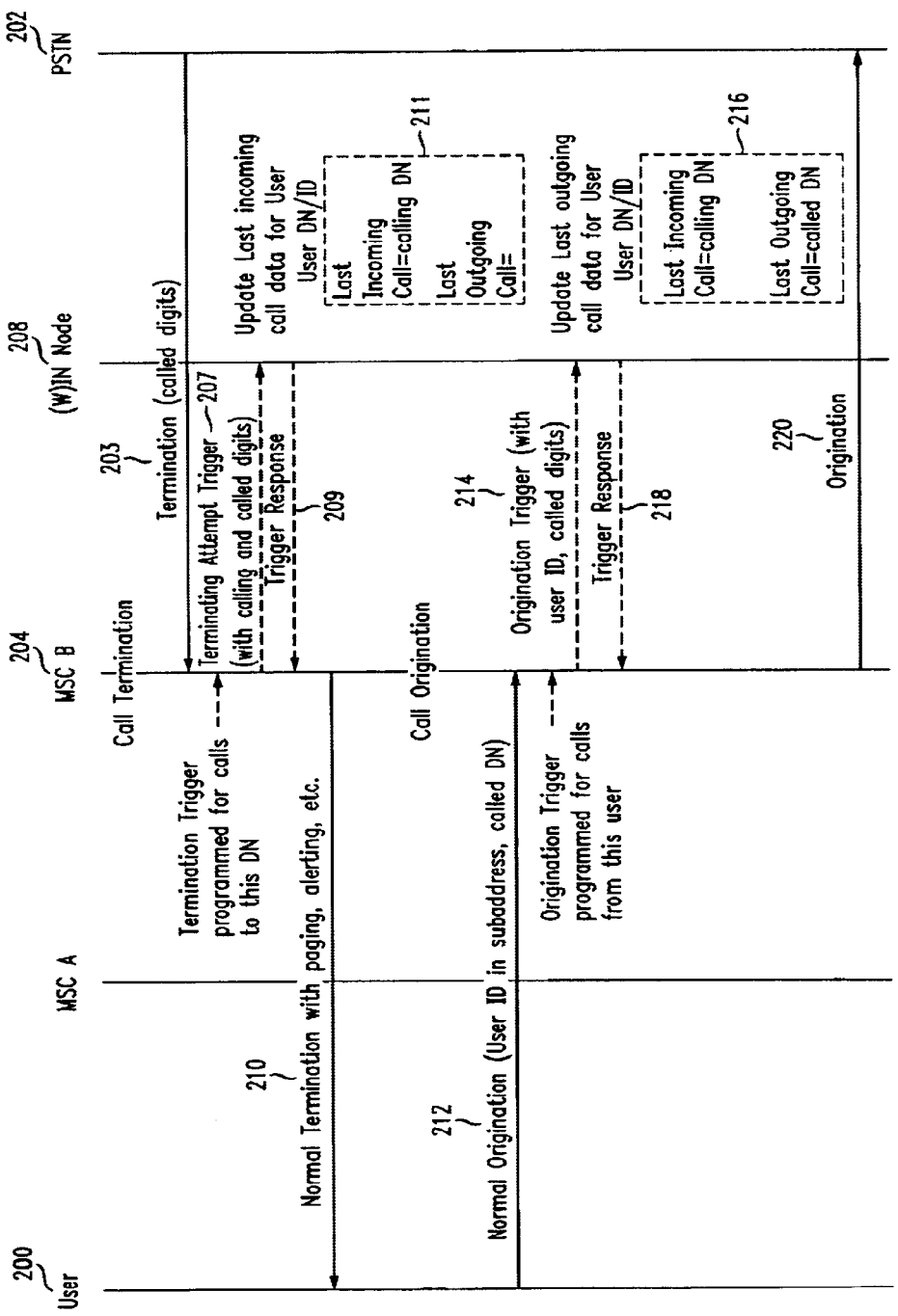
FIG. 8 illustrates a message flow diagram for call origination and termination and the associated updating of call history information for a wireless intelligent network node.

FIG. 8 illustrates a message flow diagram for updating and tracking call history information in a wireless network. When a mobile user 200 receives an incoming call from another party on the PSTN 202 and the call is terminated 203 to MSC B 204, MSC B204 transmits a termination message 207 with the calling digits to the wireless intelligent network node 208. The wireless intelligent network node 208 updates the call history information 211 with the telephone number of the other party who called the user 200. A trigger response 209 is sent by the wireless intelligent network node 208 to MSC B 206. MSC 206 terminates the call 210.

When the user 200 originates a call 212, an origination trigger with the called number 214 is sent by MSC B 206 to the wireless intelligent network node 208. The wireless intelligent network node 208 updates the call history information with the called number 216. The wireless intelligent network 216 transmits a trigger response to MSC B 206 and the origination call 220 is placed on the PSTN 202.

Figure 9:
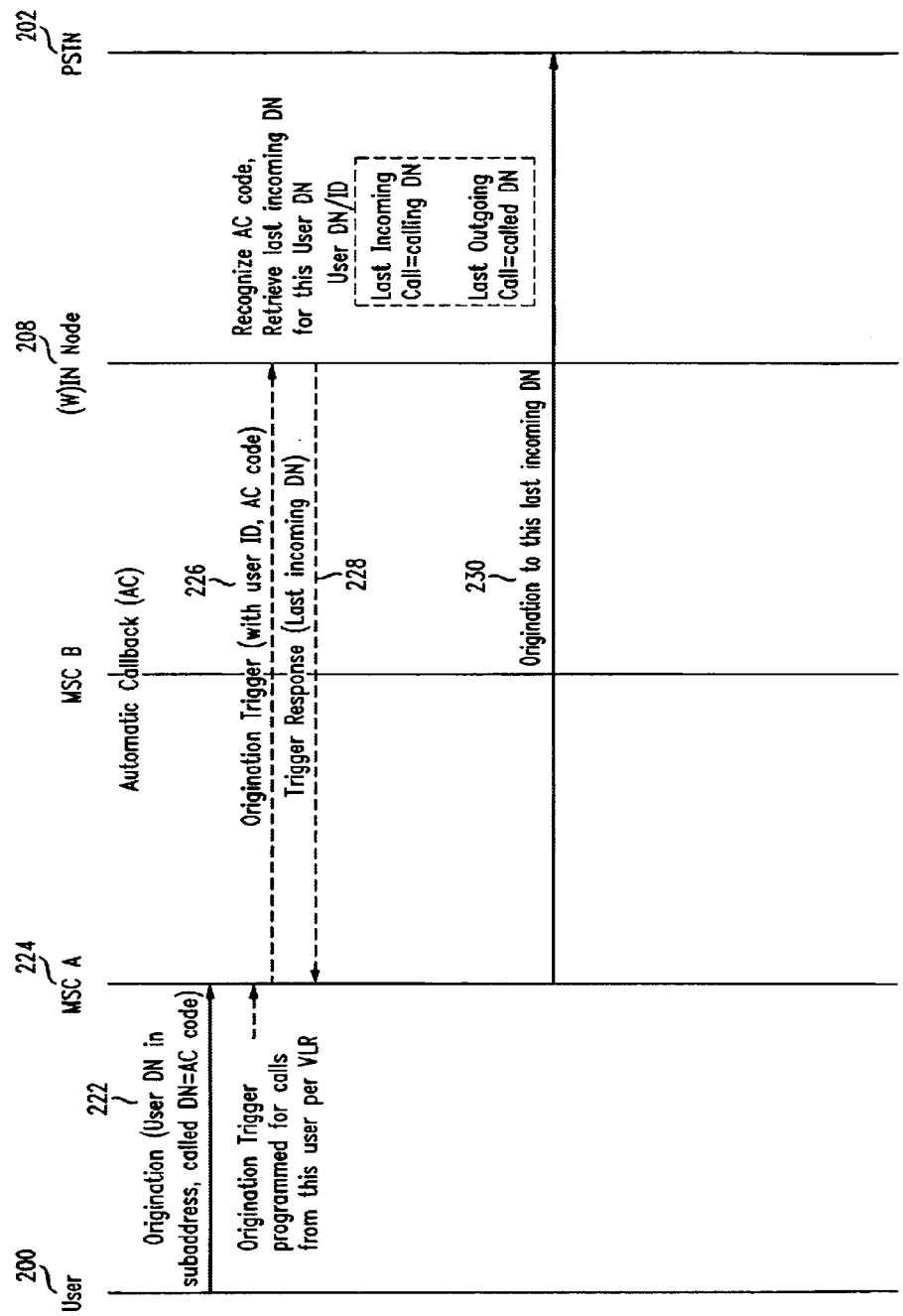
FIG. 9 illustrates a message flow diagram for automatic callback service when a mobile user moves to another mobile switching center.

FIG. 9 illustrates a message flow diagram for automatic callback service when a mobile user moves to another MSC. When the mobile user 200 from FIG. 8, invokes the automatic call back service at another location, an origination message 222 is sent to MSC A 224. MSC A 224 transmits an origination trigger 226 to the wireless intelligent network node 208. The wireless intelligent network node 208 recognizes the automatic call back service code, and retrieves the last incoming dialed number for user 200. The wireless intelligent network node 208 transmits a trigger response with the last incoming dialed number 228 to MSC A 224. MSC A 224 places the origination call 230 to the last dialed number.

Figure 10:
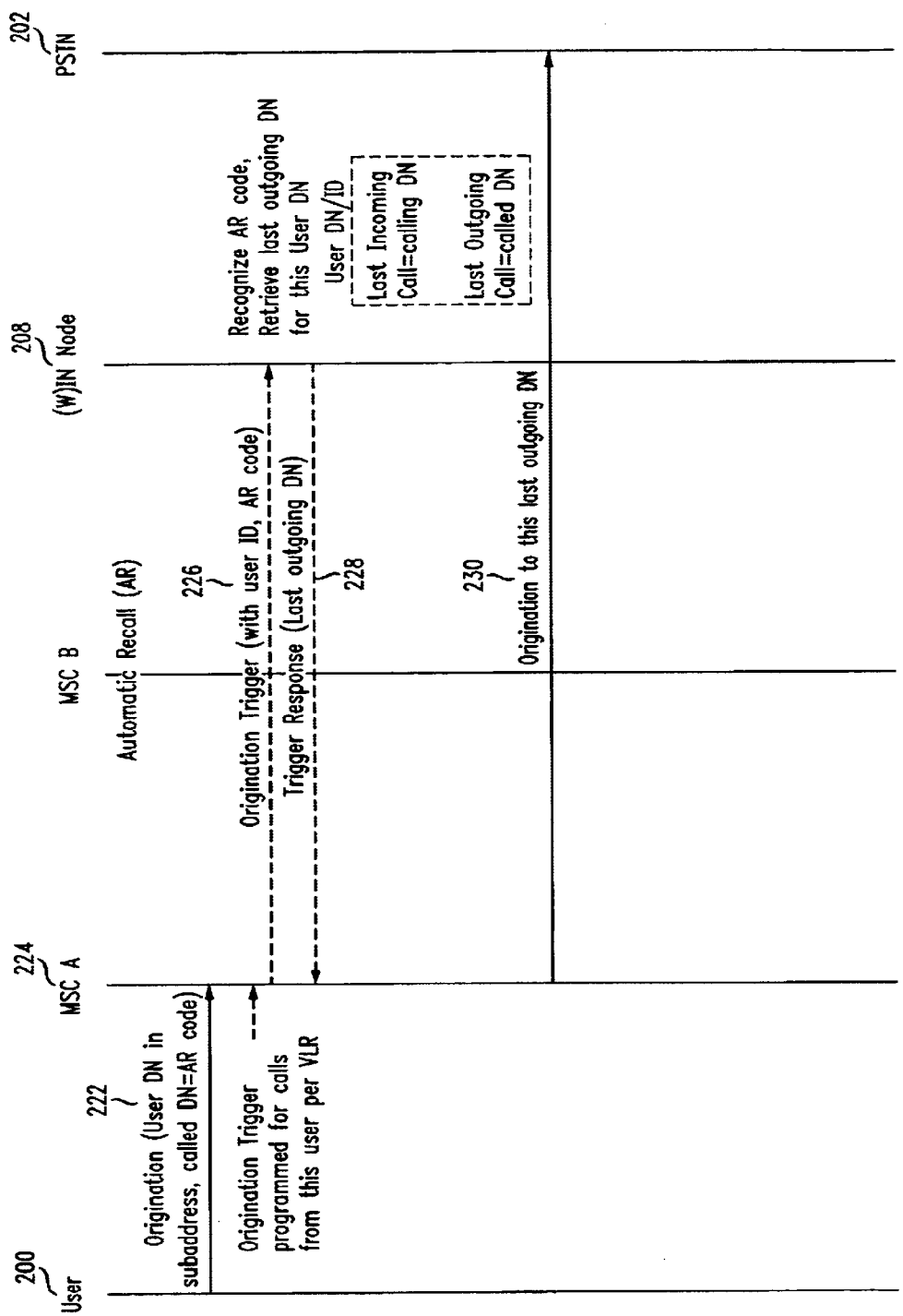
FIG. 10 illustrates a message flow diagram for automatic recall service when a mobile user moves to another mobile switching center.

FIG. 10 illustrates a message flow diagram for automatic recall service when a mobile user moves to another MSC. When the mobile user 200 from FIG. 8, invokes the automatic recall service at another MSC, an origination message 222 is sent to MSC A 224. MSC A 224 transmits an origination trigger 226 to the wireless intelligent network node 208. The wireless intelligent network node 208 recognizes the automatic recall service code, and retrieves the last outgoing dialed number for user 200. The wireless intelligent network node 208 transmits a trigger response with the last outgoing dialed number 228 to MSC A 224. MSC A 124 places the origination call 230 to the last dialed number.

Figure 11:
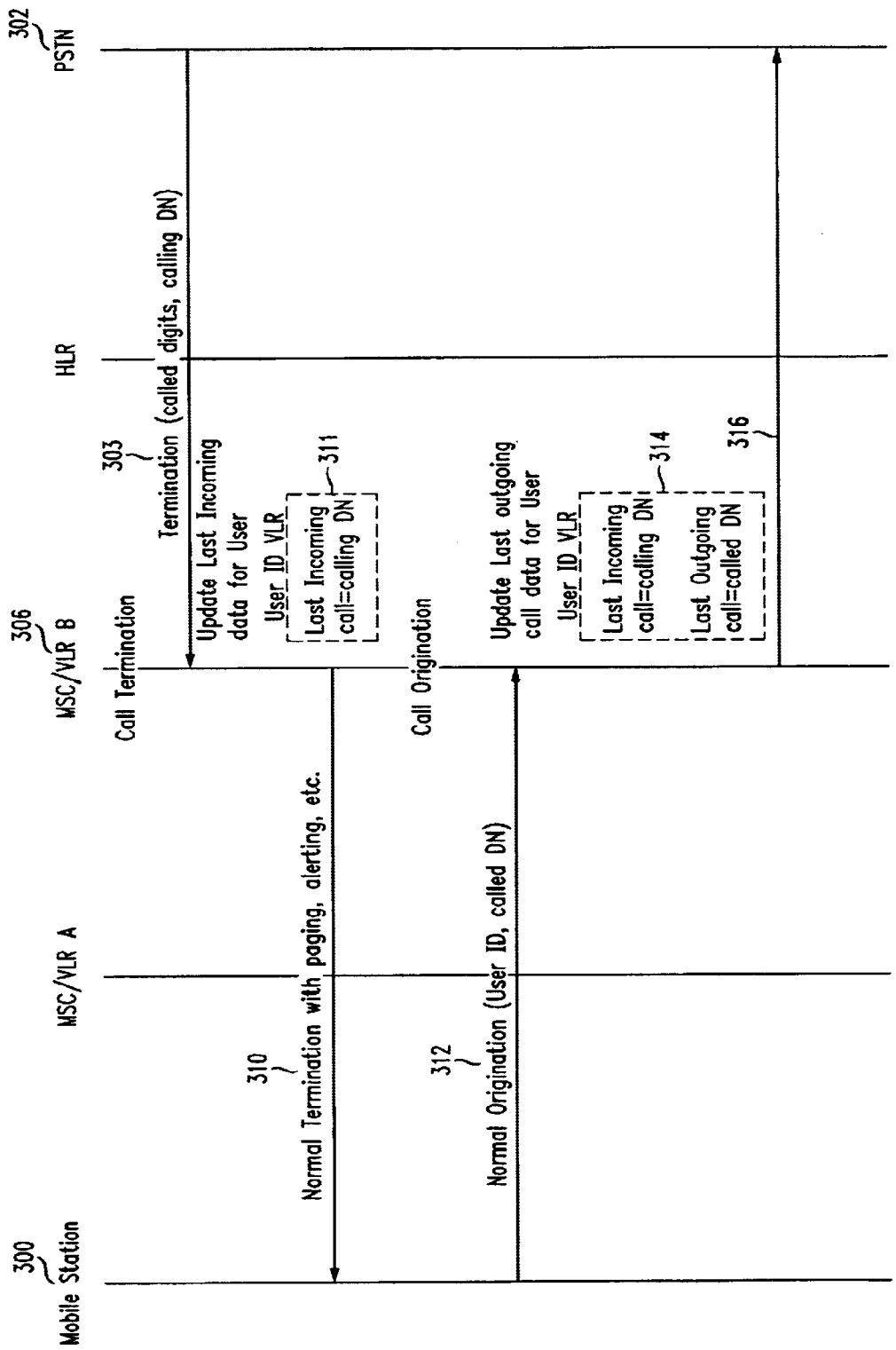
FIG. 11 illustrates a message flow diagram for storing and updating call history information in the mobile switching center/visitor location registry.

FIG. 11 illustrates a message flow diagram for storing call history information in the mobile switching center/visitor location registry (MSC/VLR). When a mobile user 300 receives an incoming call from another party on the PSTN 302 and the call is terminated 303, MSC/VLR B 306 stores the last incoming call into the call history information for the mobile user 300. The MSC/VLR 306 updates the call history information 311 with the telephone number of the other party who called the mobile user 300. The MSC/VLR 306 terminates the call 310.

When the mobile user 300 originates a call 312, the MSC/VLR 306 updates the call history information with the called number 314. The MSC/VLR 306 places origination call 316 to the PSTN 302.

Figure 12:
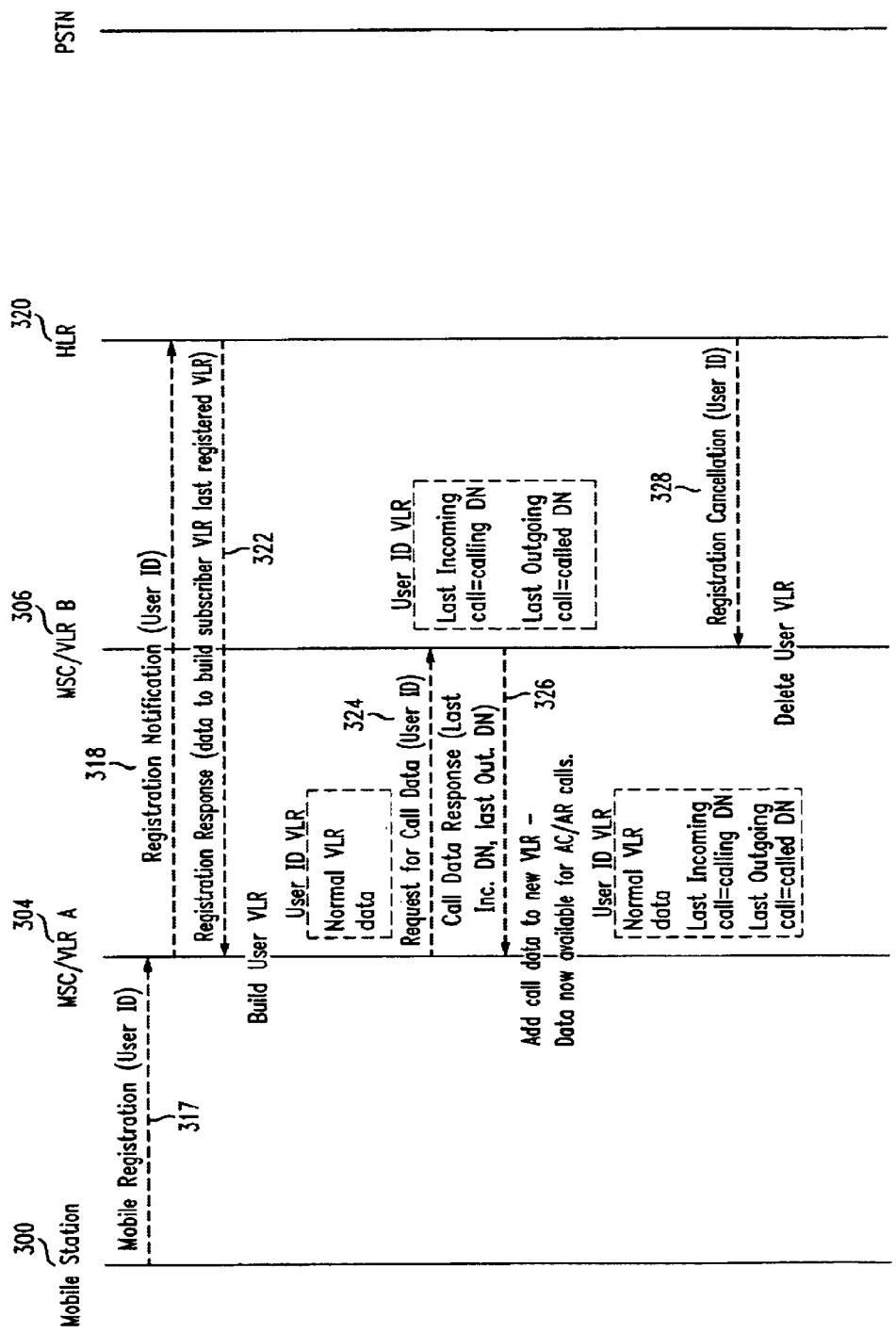
FIG. 12 illustrates a message flow diagram for a first scheme for transferring call history information to another mobile switching center/visitor location registry.

FIG. 12 illustrates a message flow diagram for a first scheme for transferring call history information to another mobile switching center. When the mobile station 300 registers with the new MSC/VLR A 304, a user ID 317 is sent from the mobile station to the MSC/VLR A 304. The MSC/VLR A 304 transmits a registration notification message 318 to the home location registry (HLR) 320. The HLR 320 replies with a registration response 322 including data to build the VLR and the last registered VLR for the mobile station 300. MSC/VLR A sends a request for call data 324 based on the instructions from the HLR 320 to MSC/VLR B 306. A call data response message 326 from the MSC/VLR B 306 is sent to the MSC/VLR A 304 with the last incoming and outgoing call data. Once received at the MSC/VLR A 304, the HLR 320 sends a registration cancellation message 328 to MSC/VLR B 306.

Figure 13:
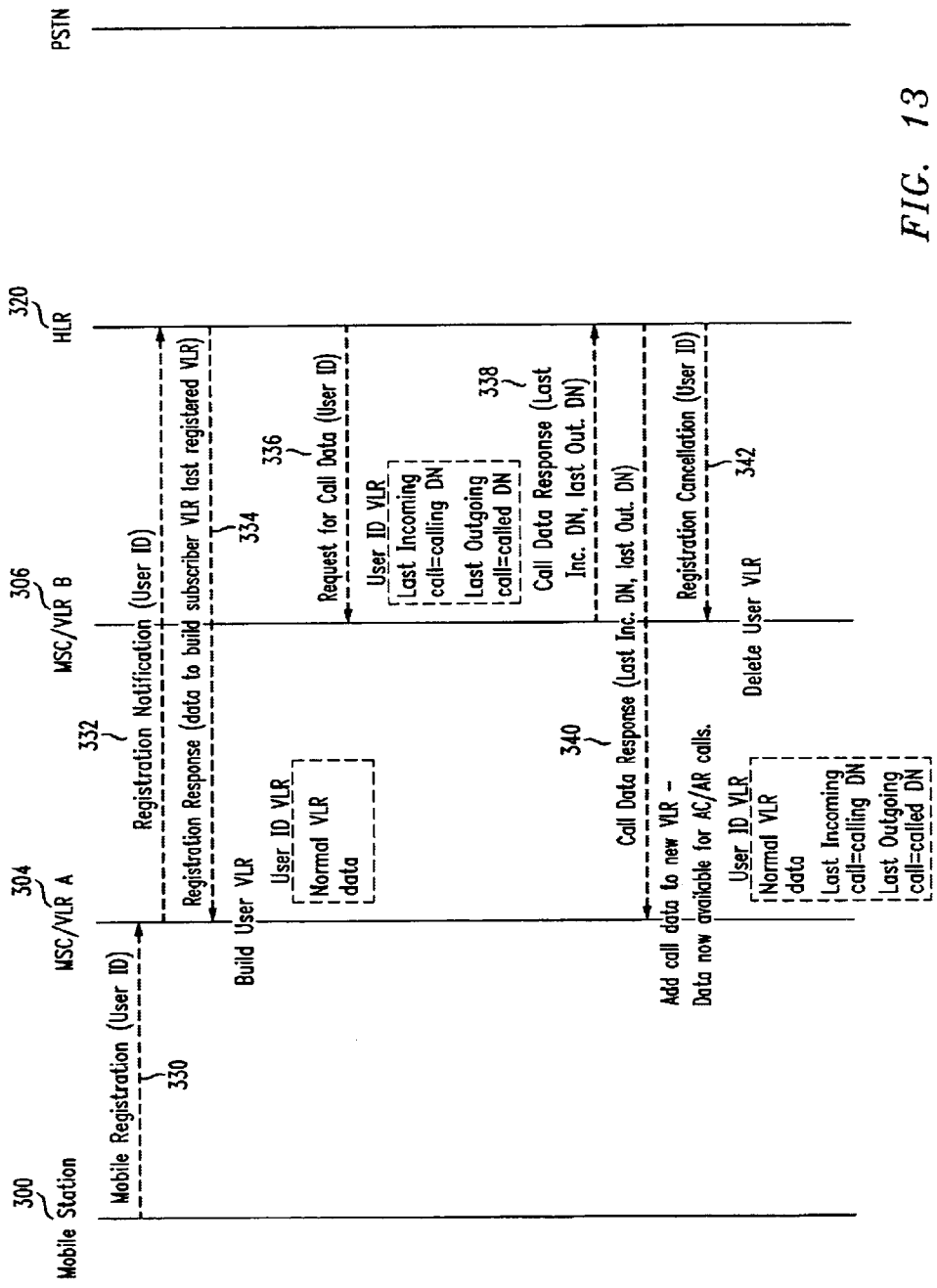
FIG. 13 illustrates a message flow diagram for a second scheme for transferring call history information to the mobile switching center/visitor location registry.

FIG. 13 illustrates a message flow diagram for a second scheme for transferring call history information to the mobile switching center. When the mobile station 300 registers with the new MSC/VLR A 304, a user ID 330 is sent from the mobile station to the MSC/VLR A 304. The MSC/VLR A 304 transmits a registration notification message 332 to the home location registry (HLR) 320. The HLR 320 replies with a registration response 334 including data to build the VLR for the mobile station 300. The HLR 320 sends a request 336 for call data to the MSC/VLR B 306. The MSC/VLR B 306 transmits the call data 338 including the last incoming and outgoing calls to the HLR 320. The HLR 320 forwards 340 this data to the MSC/VLR A 304. The HLR 320 also sends a registration cancellation message 342 to the MSC/VLR B 306.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

What is claimed is:

1. A method for tracking call history information in a switching system of a communications network, said method comprising the steps of:

storing, in a network node of a communications network, call history information for a plurality of communication devices having line ports, the call history information being only associated with a subscriber, wherein said call history information includes at least one of the following: a subscriber identification, a last incoming calling dialed number, and a last outgoing called dialed number;

automatically tracking said call history information associated only with the subscriber by said network node based on at least one originating trigger and at least one terminating trigger; and in response to registration of a communication device of the plurality of communication devices at the switching system, transmitting at least some of the call history information associated only with the subscriber from the network node to any switching system among a plurality of switching systems;

wherein the network node tracks a call history of the subscriber without regard to the line ports, thereby allowing the subscriber to maintain a common level of services at switching systems in the plurality of switching systems and making the line ports previsously used by the subscriber available to other subscribers.

2. The method of claim 1, wherein the network node comprises an intelligent network node for tracking said call history information via said at least one originating trigger and said at least one terminating trigger.

3. The method of claim 1, further comprising the step of updating the call history information when a communication device associated with said communications network receives an incoming call.

4. The method of claim 1, further comprising the step of updating the call history information when a communication device associated with said communications network originates a call.

5. The method of claim 1, wherein the transmitting step comprises the step of transmitting information for dynamically tracking the call history information independent of a line card interface from a telephone to a switch capable of dynamically assigning the telephone to the line card interface.

6. The method of claim 1, further comprising the step of utilizing the call history information to provide at least one advanced call feature for at least one of the plurality of communication devices.

7. The method of claim 6, wherein the at least one advanced call feature includes at least one of automatic recall, automatic callback, and automatic trace.

8. The method of claim 1, further comprising the step of creating a visitor location registry at a mobile switching center from the call history information of a mobile station.

9. The method of claim 1, wherein said originating and terminating triggers are associated with the plurality of communication devices.

10. The method of claim 1, wherein the plurality of communication devices comprises at least one wireline communication device and at least one wireless communication device.

11. A method for tracking call history information for users of communication devices in a communications network, said method comprising the steps of:

storing, at a network device associated with a communications network, call history information for a plurality of communication devices having line ports, the call history information being only associated with a subscriber, operable within said communications network;

in response to registration of a communication device, for the subscriber, of the plurality of communication devices at a first switching center of said communication network, requesting transport of the call history information associated only with the subscriber to the first switching center; and transmitting at least some of the call history information associated only with the subscriber from the network device to the first switching center, such that the history information associated only with the subscriber is tracked independent of a line card interface from a telephone to a switch capable of dynamically assigning the telephone to the line card interface; and updating the call history information associated only with the subscriber when a communication device receives an incoming call and when a communication device originates a call;

wherein the network device tracks a call history of the subscriber without regard to the line ports, thereby allowing the subscriber to maintain a common level of services at switching systems in the plurality of switching systems and making the line ports previously used by the subscriber available to other subscribers.

12. The method of claim 11, wherein the network device comprises an intelligent network node.

13. The method of claim 11, wherein the network device comprises a second switching center.

14. The method of claim 11, wherein said call history information comprises at least one of the following: a subscriber identification, a last incoming calling dialed number, and a last outgoing called dialed number.

15. The method of claim 11, wherein the step of transmitting at least some of the call history information from the network device to the first switching center further comprises the step of transmitting information for dynamically tracking the call history information independent of a line card interface from a telephone to a switch capable of dynamically assigning the telephone to the line card interface.

16. The method of claim 11, further comprising the step of utilizing the call history information to provide at least one advanced call feature for at least one of the plurality of communication devices.

17. The method of claim 16, wherein the at least one advanced call feature includes at least one of automatic recall, automatic callback, and automatic trace.

18. The method of claim 11, further comprising the step of creating a visitor location registry at a mobile switching center from the call history information of a mobile station.

19. The method of claim 11, further comprising the step of tracking the call history information via originating and terminating triggers associated with the plurality of communication devices.

20. The method of claim 11, wherein, the plurality of communication devices comprises at least wireline communication device and at least one wireless communication device.

* * * * *